US009324496B2

(12) United States Patent
Lee et al.

(10) Patent No.: US 9,324,496 B2
(45) Date of Patent: Apr. 26, 2016

(54) MULTILAYER CERAMIC ELECTRONIC COMPONENT AND METHOD OF MANUFACTURING THE SAME

(75) Inventors: Jong Ho Lee, Gyunggi-do (KR); Jae Yeol Choi, Gyunggi-do (KR); Doo Young Kim, Gyunggi-do (KR); Myung Jun Park, Gyunggi-do (KR); Yu Na Kim, Gyunggi-do (KR); Sung Woo Kim, Gyunggi-do (KR)

(73) Assignee: SAMSUNG ELECTRO-MECHANICS CO., LTD., Gyunggi-Do (KR)

( * ) Notice: Subject to any disclaimer, the term of this patent is extended or adjusted under 35 U.S.C. 154(b) by 287 days.

(21) Appl. No.: 13/620,239

(22) Filed: Sep. 14, 2012

(65) Prior Publication Data
US 2014/0009867 A1    Jan. 9, 2014

(30) Foreign Application Priority Data

Jul. 4, 2012    (KR) .......................... 10-2012-0073055

(51) Int. Cl.
| *H01G 4/012* | (2006.01) |
| *H01G 4/30* | (2006.01) |
| *H01G 4/008* | (2006.01) |
| *H01G 4/005* | (2006.01) |
| *H01G 4/12* | (2006.01) |

(52) U.S. Cl.
CPC .............. *H01G 4/012* (2013.01); *H01G 4/0085* (2013.01); *H01G 4/30* (2013.01); *H01G 4/005* (2013.01); *H01G 4/12* (2013.01)

(58) Field of Classification Search
None
See application file for complete search history.

(56) References Cited

U.S. PATENT DOCUMENTS

| 7,644,480 B2 * | 1/2010 | Kim ...................... H01G 4/012 |
| | | 29/25.03 |
| 8,743,530 B2 * | 6/2014 | Kuroda et al. ............ 361/306.3 |
| 2004/0240146 A1 * | 12/2004 | Kayatani ................ H01G 2/103 |
| | | 361/306.3 |
| 2009/0052110 A1 * | 2/2009 | Masuda et al. ................. 361/303 |
| 2009/0310278 A1 * | 12/2009 | Tani .......................... 361/306.3 |
| 2010/0039748 A1 * | 2/2010 | Fujii ....................... H01G 2/08 |
| | | 361/274.1 |

FOREIGN PATENT DOCUMENTS

| JP | H08-162357 | * 6/1996 | .............. H01G 4/12 |
| JP | 11-040449 A | 2/1999 | |

OTHER PUBLICATIONS

Machine translation of JP 11-040449.*
English Language abstract for JP H08-162357.*

* cited by examiner

*Primary Examiner* — Dion R Ferguson
(74) *Attorney, Agent, or Firm* — McDermott Will & Emery LLP

(57) ABSTRACT

There is provided a multilayer ceramic electronic component, including: a ceramic body including a dielectric layer and having first and third surfaces opposing each other in a length direction of the dielectric layer and second and fourth surfaces opposing each other in a width direction thereof; and a multilayer part including a first internal electrode and a second internal electrode disposed to oppose each other, while having the dielectric layer interposed there between in the ceramic body, and exposed to the first and third surfaces of the ceramic body, respectively; wherein one or more residual carbon removing path parts are formed to be protruded on both side of the first and second internal electrodes in a length direction of the ceramic body.

7 Claims, 7 Drawing Sheets

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2012-0073055 filed on Jul. 4, 2012, in the Korean Intellectual Property Office, the disclosure of which is incorporated herein by reference.

BACKGROUND OF THE INVENTION

1. Field of the Invention

The present invention relates to a multilayer ceramic electronic component from which residual carbon may be effectively removed.

2. Description of the Related Art

A multilayer ceramic electronic component includes a plurality of stacked dielectric layers, internal electrodes disposed to oppose each other, having each dielectric layer interposed there between, and external electrodes electrically connected to respective internal electrodes.

Multilayer ceramic electronic component have been widely used as components in a mobile communications device such as a computer, a personal digital assistant (PDA), a mobile phone, or the like, due to advantages thereof such as a small size, high capacity, ease of mounting, and the like.

Recently, as electronic products have been miniaturized and multi-functionalized, chip components have also tended to be miniaturized and multi-functionalized. As a result, there is a need to miniaturize multilayer ceramic electronic components and increase the capacity thereof.

Therefore, a dielectric layer and an internal electrode have been thinned and multilayered through various methods. Recently, multilayer ceramic electronic components including dielectric layers having a reduced thickness and an increased number thereof have been manufactured.

Due to a trend in which an amount of a binder is increased in order to provide strength to a particulated and thinned multilayer ceramic electronic component, it has been difficult to remove residual carbon from the multilayer ceramic electronic component. In particular, in a chip having a high capacity and large size, a region having a large residual amount of residual carbon in the center of the chip after performing a plasticizing process has increased in size.

In the case that the residual amount of residual carbon is large in the multilayer ceramic electronic component, a difference in firing behavior is generated according to a position thereof in the chip, and the difference in the firing behavior may degrade reliability of the multilayer ceramic electronic component, for example, internal electrodes may be disconnected, and the like.

RELATED ART DOCUMENT

[Patent Document] Japanese Patent Laid-Open Publication No. JP 1999-040449

SUMMARY OF THE INVENTION

An aspect of the present invention provides a residual carbon removing path part for reducing a residual amount of residual carbon in a multilayer ceramic electronic component.

According to an aspect of the present invention, there is provided a multilayer ceramic electronic component, including: a ceramic body including a dielectric layer and having first and third surfaces opposing each other in a length direction of the dielectric layer and second and fourth surfaces opposing each other in a width direction thereof; and a multilayer part including a first internal electrode and a second internal electrode disposed to oppose each other, while having the dielectric layer interposed there between in the ceramic body, and exposed to the first and third surfaces of the ceramic body, respectively; wherein one or more residual carbon removing path parts are formed to be protruded on both sides of the first and second internal electrodes in a length direction of the ceramic body.

The residual carbon removing path parts may be exposed to the second surface and the fourth surface of the ceramic body, and have a length smaller than those of the first and second internal electrodes in the length direction of the ceramic body.

The residual carbon removing path parts may be provided in plural, and the plurality of residual carbon removing path parts may be spaced apart from each other by predetermined intervals on both sides of the first and second internal electrodes.

The residual carbon removing path parts exposed to the second surface and the residual carbon removing path parts exposed to the fourth surface may be symmetrical with regard to each other in a cross-section of the ceramic body in width-length directions.

The residual carbon removing path parts may be formed on one of both sides of the first and second internal electrodes, and alternately exposed to the second and fourth surfaces according to an order in which the first and second internal electrodes are stacked.

The residual carbon removing path parts may be respectively exposed to the second and fourth surfaces, and the residual carbon removing path parts exposed to the second and fourth surfaces may be disposed to be offset from each other in a cross-section of the ceramic body in width-length directions.

The multilayer ceramic electronic component may further include a margin part including epoxy to cover the second and fourth surfaces of the ceramic body to which the residual carbon removing path parts are exposed.

The margin part may include nonconductive powder formed of any one selected from a group consisting of aluminum oxide and silicon oxide.

The margin part may have a width of 200 μm or less in the width direction of the ceramic body.

According to another aspect of the present invention, there is provided a method of manufacturing a multilayer ceramic electronic component, the method including preparing ceramic green sheets including a dielectric layer, forming an internal electrode pattern on each of the ceramic green sheets, forming a residual carbon removing path pattern on at least one portion of both sides of the internal electrode pattern, forming a ceramic lamination by stacking the ceramic green sheets each having the internal electrode pattern and the residual carbon removing path pattern formed thereon, and forming a ceramic body by cutting the ceramic lamination.

The method may further include forming external electrodes on both outer surfaces of the ceramic body so as to be electrically connected to the first and second internal electrodes.

The method may further include forming a margin part on both surfaces of the ceramic body so as to insulate the residual carbon removing path part exposed to the ceramic body.

The margin part may include nonconductive powder formed of any one selected from a group consisting of epoxy resin and aluminum oxide or silicon oxide.

The forming of the margin part may be performed by a printing method.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
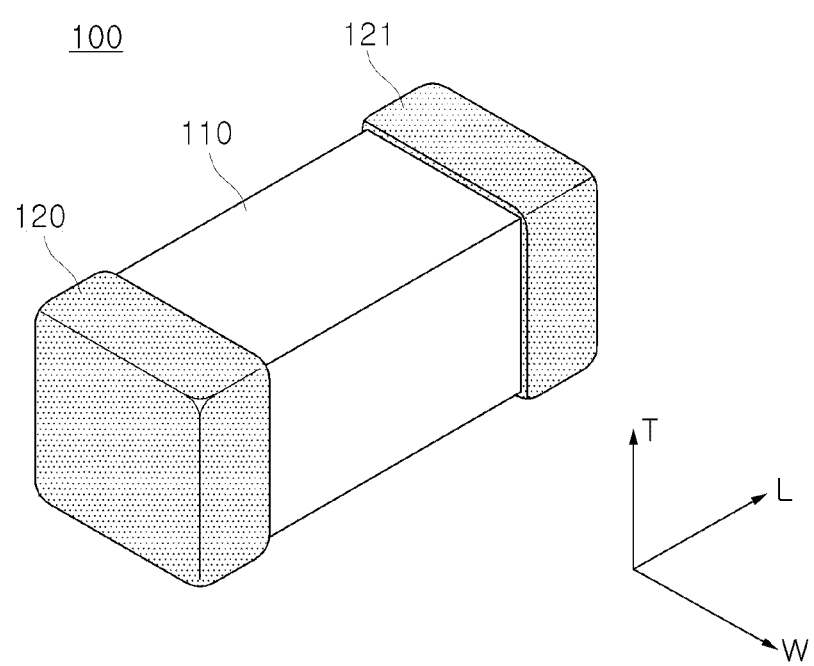
FIG. 1 is a schematic perspective view showing a multilayer ceramic capacitor according to an embodiment of the present invention.

Hereinafter, embodiments of the present invention will be described in detail (with reference to the accompanying drawings). The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Hereinafter, a multilayer ceramic electronic component according to embodiments of the present invention will be described with reference to accompanying drawings, in particular, as a multilayer ceramic capacitor. However, the present invention is not limited thereto.

FIG. 1 is a schematic perspective view showing a multilayer ceramic capacitor 100 according to an embodiment of the present invention.

Referring to FIG. 1, the multilayer ceramic capacitor according to the embodiment of the present invention may include a ceramic body 110 and external electrodes 120 and 121. The ceramic body 110 may have a hexahedral shape. Directions in a hexahedron will be defined in order to clearly describe the embodiments of the present invention. L, W and T shown in FIG. 1 refer to a length direction, a width direction, and a thickness direction, respectively.

The ceramic body 100 may include a plurality of dielectric layers stacked in the thickness direction T. The plurality of dielectric layers constituting the ceramic body is fired and may be integrated such that a boundary between adjacent dielectric layers may not be readily apparent.

Here, the dielectric layers may be formed of ceramic powder having high dielectric constant. The ceramic powder may be a barium titanate ($BaTiO_3$)-based powder, a strontium titanate ($SrTiO_3$)-based powder, or the like, but is not limited thereto.

In a material for forming the dielectric layers, various ceramic additives, organic solvents, plasticizers, binders, dispersing agents, and the like, may be added to a powder such as a barium titanate ($BaTiO_3$) powder, or the like, according to the intended usage of the present invention.

First and second internal electrodes may be formed in the ceramic body 110. The internal electrodes may be formed on the dielectric layers, and may be disposed to oppose each other in a direction in which the dielectric layers are stacked, while having each dielectric layer there between, through a firing process.

The first and second internal electrodes may be formed of a conductive metal, for example, nickel (Ni) or a Ni alloy. The Ni alloy may contain Mn, Cr, Co or Al together with Ni. The internal electrodes may be formed by printing a conductive paste including metal powder such as Ni, or the like, on one surface of a ceramic green sheet forming the dielectric layer so as to have a predetermined pattern.

In the conductive paste, an organic binder and an organic solvent having a high boiling point may be used to provide thixotropy and binding force between powders.

The first and second external electrodes 120 and 121 may be formed on both end surfaces of the ceramic body 110, opposing each other. As shown in FIG. 1, the first and second external electrodes 120 and 121 may cover outer peripheral surfaces of both ends of the ceramic body 110.

Hereinafter, in the ceramic body, surfaces on which the first and second external electrodes are formed refer to as a first surface and a third surface, respectively, and surfaces perpendicular to the first and third surfaces refer to as a second surface and a fourth surface, respectively.

The first external electrode 120 and the second external electrode 121 may be electrically separated from each other. The first external electrode 120 may be electrically connected to one end of the first internal electrode exposed to one surface of the ceramic body 110, and the second external electrode 121 may be electrically connected to one end of the second internal electrode exposed to the other surface of the ceramic body 110, facing one surface thereof in the length direction. Therefore, the external electrodes 120 and 121 may serve as an external terminal.

The external electrodes 120 and 121 may be formed of copper (Cu) or a Cu alloy.

Capacity may be formed in a portion of the ceramic body 110, in which a plurality of first internal electrodes and a plurality of second internal electrodes are overlapped in a lamination direction thereof, and the other portions of the ceramic body 110 may serve to protect the portion in which the capacity is formed.

Hereinafter, a portion in which the internal electrodes are stacked refers to as a capacity forming layer, and the dielectric layers disposed in portions other than the capacity forming layer and formed on upper and lower surfaces of the capacity forming layer refers to as protective layers.

FIGS. 2 through 5 are cut-away perspective views each showing an example of a multilayer ceramic capacitor according to another embodiment of the present invention.

Referring to FIGS. 2 through 5, in internal electrodes 220 and 225, residual carbon removing path parts 230 and 235 may be protruded on at least portions of both sides of the internal electrodes 220 and 225 in the length direction of the ceramic body.

The residual carbon removing path parts according to the embodiment of the present invention are exposed to the second surface and the fourth surface of the ceramic body, and refer to paths through which residual carbon is discharged from the ceramic body at the time of firing the ceramic body.

The residual carbon removing path parts 230 and 235 may be formed of the same material as that of the conductive paste forming the first and second internal electrodes 220 and 225, and may be extension parts of the first and second internal electrodes 220 and 225.

In addition, in the length direction of the ceramic body, lengths of the residual carbon removing path parts 230 and 235 may be smaller than those of the first and second internal electrodes 220 and 225.

Figure 2:
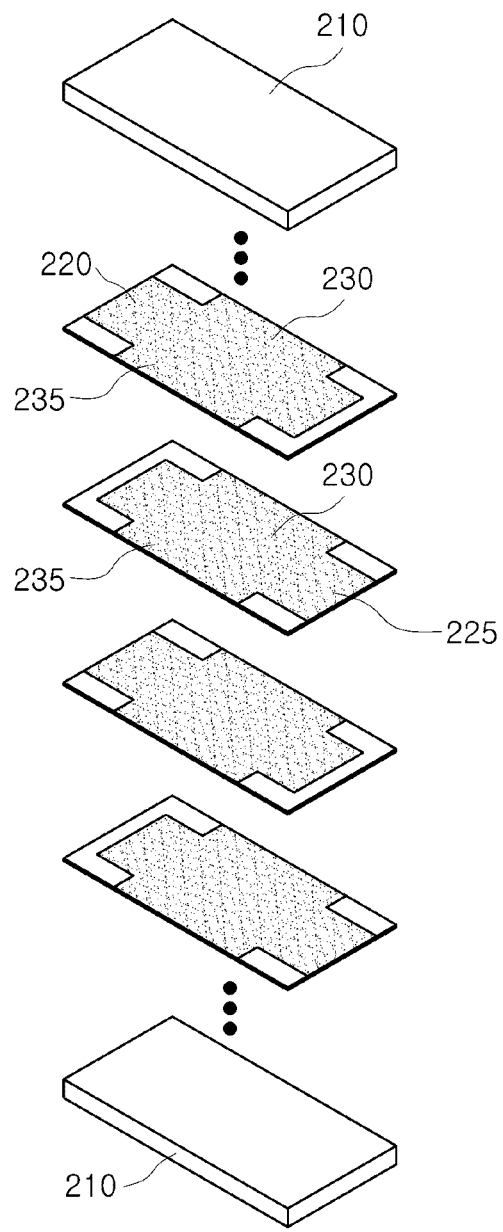
FIGS. 2 through 5 are cut-away perspective views each showing an example of a multilayer ceramic capacitor according to another embodiment of the present invention.

Referring to FIG. 2, the residual carbon removing path parts 230 and 235 may be exposed to both of the second and fourth surfaces of the ceramic body, and the residual carbon removing path part 230 or 235 may be singularly formed on each of the both sides of the first and second internal electrodes 220 and 225.

That is, the residual carbon removing path parts 230 and 235 on respective internal electrodes 220 and 225 may be exposed to the second and fourth surfaces of the ceramic body.

Moreover, in a cross-section of the ceramic body in width-length (W-L) directions thereof, the residual carbon removing path parts may be symmetrical with regard to each other based on a line extended in the length direction from the first surface to the third surface, in the center of the ceramic body in the width direction.

Figure 3:
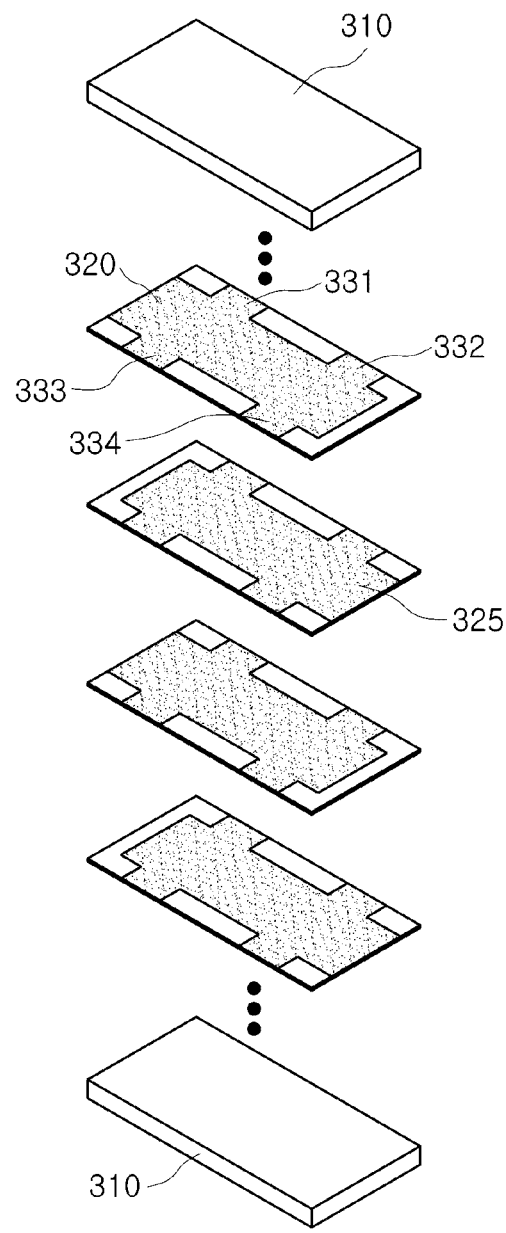

Referring to FIG. 3, residual carbon removing path parts 331, 332, 333, and 334 may be exposed to both of the second surface and the fourth surface of the ceramic body, and the plurality of residual carbon removing path parts 331, 332, 333, and 334 may be spaced apart from each other by predetermined intervals on both sides of first and second internal electrodes 320 and 325.

That is, the residual carbon removing path parts 331, 332, 333, and 334 on respective internal electrodes 320 and 325 may be exposed to the second and fourth surfaces of the ceramic body. Moreover, in a cross-section of the ceramic body in width-length (W-L) directions thereof, the residual carbon removing path parts 331, 332, 333, and 334 may be symmetrical with regard to each other based on a line extended in the length direction from the first surface to the third surface, in the center of the ceramic body in the width direction.

Figure 4:
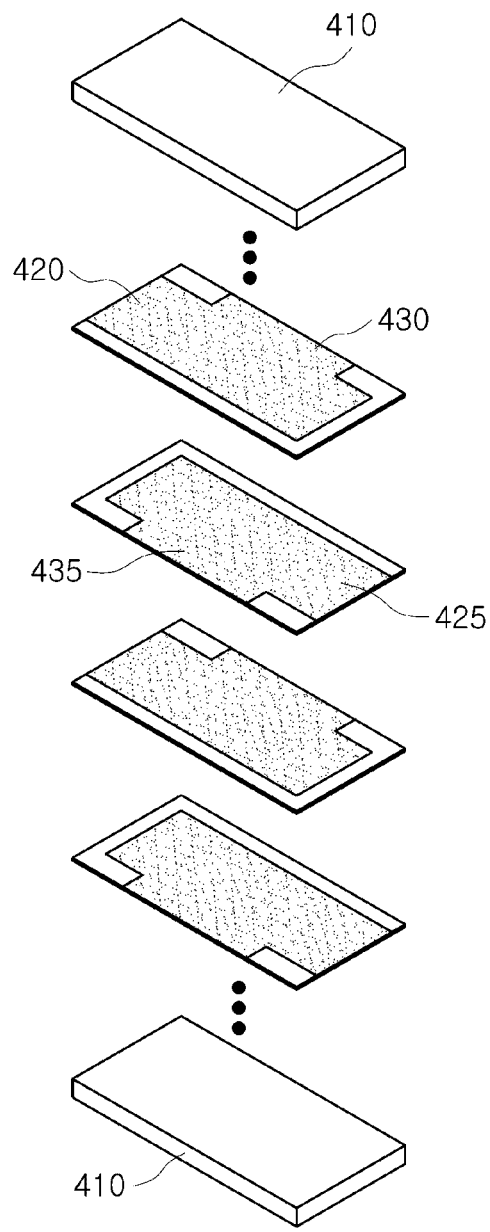

Referring to FIG. 4, residual carbon removing path part 430 or 435 may be exposed to one of the second surface and the fourth surface of the ceramic body and may be singularly formed on one of both sides of the first and second internal electrodes 420 and 425 such that the residual carbon removing path parts 430 and 435 are alternately exposed to the second surface and the fourth surface according to a lamination order thereof.

That is, for example, in a layer having the first internal electrode formed thereon, the residual carbon removing path part 430 may be exposed to the second surface, while in a layer having the second internal electrode formed thereon, the residual carbon removing path part 435 may be exposed to the fourth surface.

Figure 5:
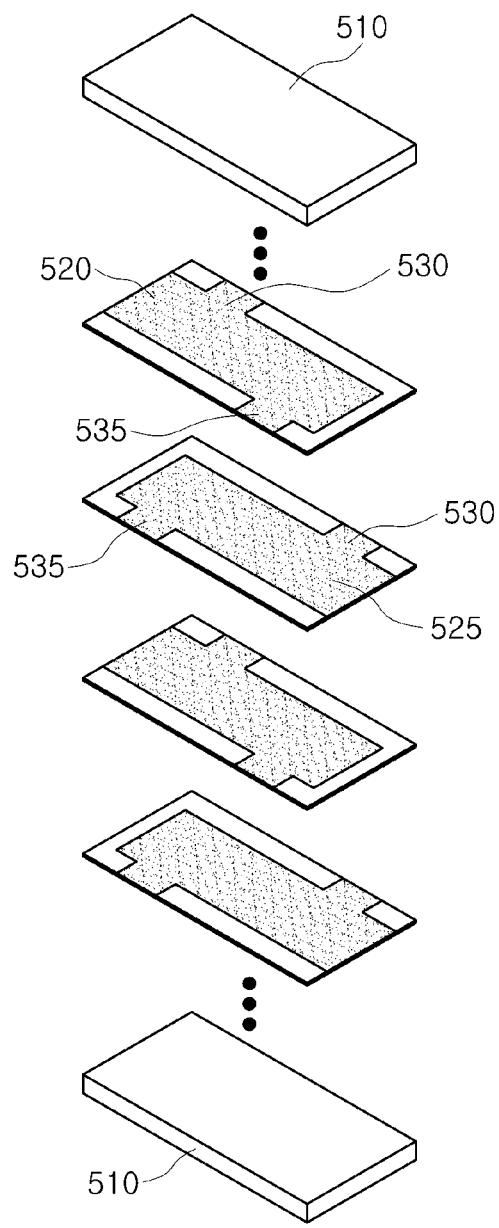

Referring to FIG. 5, the residual carbon removing path parts 530 and 535 may be exposed to both of the second and fourth surfaces of the ceramic body, and the residual carbon removing path part 530 or 535 may be singularly formed on each of both sides of the first and second internal electrodes 520 and 525.

The residual carbon removing path parts 530 and 535 exposed to the second surface and the fourth surface, respectively, may be disposed such that they are offset from each other at the cross-section in a width-length direction W-L. That is, the residual carbon removing path part 530 exposed to the second surface may be spaced apart by a predetermined interval from a virtual residual carbon removing path region which is formed by extending the residual carbon removing path part 535 exposed to the fourth surface toward the second surface in the width direction.

That is, in the second or the fourth surface of the ceramic body, the residual carbon removing path parts 530 and 535 may be differentiated into two regions in which the residual carbon removing path parts 530 and 535 are stacked in parallel in the thickness direction. In the case in which the residual carbon removing path part in one region of two regions is exposed to the surface on the layer having the first internal electrode formed thereon, the residual carbon removing path part in the other region may be exposed to the surface on the layer having the second internal electrode formed thereon.

As the conductive paste forming the internal electrodes, an organic binder and an organic solvent having a high boiling point may be used to provide paste binding force, and a debinding process may be performed at the time of plasticizing and firing the ceramic body. The residual carbon may be removed during the debinding process and generally removed to the surfaces of the ceramic body in which the internal electrodes are exposed.

According to the embodiment of the present invention, the residual carbon removing path parts are exposed to the second and fourth surfaces as well as the first and third surfaces to which the internal electrodes are exposed, thereby increasing a removal ratio of residual carbon.

Figure 6:
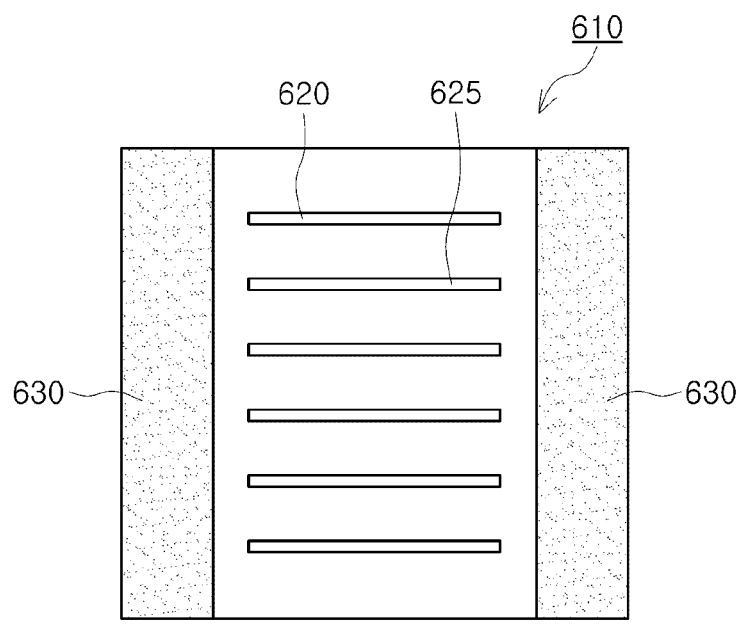
FIG. 6 is a cross-sectional view of a multilayer ceramic capacitor according to another embodiment of the present invention in width-thickness (W-T) directions, taken in a length direction thereof.

FIG. 6 is a cross-sectional view of a ceramic body in width-thickness (W-T) directions, taken in the length direction thereof in order to explain a multilayer ceramic capacitor 610 according to an embodiment of the present invention.

Referring to FIG. 6, the ceramic body may include a margin part 630 including epoxy so as to cover the second and fourth surfaces, such that residual carbon removing path parts exposed to the outside may be insulated.

The margin part 630 including epoxy may further include nonconductive powder formed of any one selected from a group consisting of aluminum oxide and silicon oxide.

The margin part 630 has a thickness sufficient to insulate the residual carbon removing path parts exposed to the outside. However, in the case in which the thickness of the margin part is greater than 200 μm, a size of the multilayer ceramic capacitor is large, such that the multilayer ceramic capacitor having high capacity and a small size may not be implemented.

Figure 7:
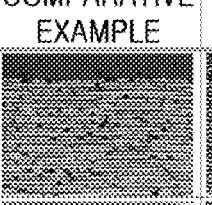
FIG. 7 is a cross-sectional photograph for comparing the multilayer ceramic capacitor according to an inventive example of the present invention with a multilayer ceramic capacitor according a comparative example of the present invention.

FIG. 7 is a photograph for comparing cross-sections of the multilayer ceramic capacitor according to an inventive example of the present invention with a multilayer ceramic capacitor according a comparative example of the present invention. The cross-section was a cross-section of the multilayer ceramic capacitor taken in width-thickness (W-T) directions, in the length direction thereof, and was divided into three regions in the thickness direction, such as an upper portion, a central portion, and a lower portion.

The multilayer ceramic capacitor according to the comparative example does not include a residual carbon removing path part formed therein, and the multilayer ceramic capacitor according to the inventive example of the present invention is the multilayer ceramic capacitor shown in FIG. 4.

It may be appreciated from FIG. 7 that a dark shade portion indicates that the internal electrodes are disconnected due to a difference in firing behavior, and the dark shade portion according to the inventive example of the present invention was smaller as compared to that of the comparative example. In particular, it may be appreciated that the disconnection of the internal electrodes in the central portion significantly affected by the residual amount of residual carbon was remarkably reduced, as compared to that of the comparative example.

Hereinafter, a method of manufacturing a multilayer ceramic capacitor according to an embodiment of the present invention will be described.

In the method of manufacturing a multilayer ceramic capacitor according to an embodiment of the present invention, features and descriptions the same as those of the multilayer ceramic capacitor according to the embodiment of the present invention will be omitted.

First, ceramic green sheets including a dielectric material may be produced. A slurry was fabricated by mixing ceramic power, a binder, and solvent and then formed to have a sheet shape having a thickness of several micrometers (μm) by using a doctor blade method.

Next, an internal electrode pattern may be formed on each ceramic green sheet by using a metal paste. The metal paste is not specifically limited, and may be formed of at least one selected from a group consisting of nickel (Ni), copper (Cu), palladium (Pd), and a palladium-silver (Pd—Ag) alloy.

After forming of the internal electrode pattern, a residual carbon removing path pattern may be formed in at least one of both sides of the internal electrode pattern. The residual carbon removing path pattern may be formed of the same material as that of the metal paste forming the internal electrode pattern, and may be an extension of the internal electrode pattern.

The ceramic green sheets each having the internal electrode pattern and the residual carbon removing path pattern formed thereon may be stacked to form a ceramic lamination, and then ceramic lamination may be cut, thereby forming a ceramic body.

Then, external electrodes may be formed on both outer surfaces of the ceramic body. The external electrodes may be formed of the same conductive material as that of the internal electrode, but are not limited thereto. For example, the external electrodes may be formed of copper (Cu), silver (Ag), nickel (Ni), or the like.

The external electrodes may be formed by performing an application of a conductive paste prepared by adding a glass frit into metal powder and then performing firing thereon, and a plating process may be performed after forming the external electrodes on the ceramic body.

After forming of the external electrodes, a margin part including epoxy may be formed on both surfaces of the ceramic body on which the external electrodes are not formed.

In the case of forming the external electrodes after forming the margin part, since a melting point of an epoxy resin may be lower than a firing temperature at which a conductive paste forming the external electrodes is fired, the epoxy resin may be melted.

The forming of the margin part including the epoxy resin may be performed by a printing method.

As set forth above, the binder is efficiently removed, whereby firing behavior can be uniformly maintained, and the multilayer ceramic electronic component can have improved reliability.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body including a dielectric layer and having first and third surfaces opposing each other in a length direction of the dielectric layer and second and fourth surfaces opposing each other in a width direction thereof;
   a multilayer part including a first internal electrode and a second internal electrode disposed to oppose each other, while having the dielectric layer interposed therebetween in the ceramic body, and exposed to the first and third surfaces opposing each other in a length direction of the ceramic body, respectively; and
   first and second external electrodes disposed on the first and third surfaces opposing each other in a length direction of the ceramic body,
   wherein one or more residual carbon removing path parts are formed to be protruded from both sides of the first and second internal electrodes in a width direction of the ceramic body, and exposed to the second and fourth surfaces opposing each other in a width direction thereof, respectively,
   wherein the multilayer ceramic electronic component further comprises a margin part including epoxy to cover the second and fourth surfaces opposing each other in a width direction of the ceramic body to which the residual carbon removing path parts are exposed, and
   wherein the residual carbon removing path parts are provided in plural, and the plurality of residual carbon removing path parts are spaced apart from each other by predetermined intervals on both sides of the first and second internal electrodes.

2. The multilayer ceramic electronic component of claim 1, wherein the residual carbon removing path parts have a length smaller than those of the first and second internal electrodes in the length direction of the ceramic body.

3. The multilayer ceramic electronic component of claim 2, wherein the residual carbon removing path parts exposed to the second surface and the residual carbon removing path parts exposed to the fourth surface are symmetrical with regard to each other in a cross-section of the ceramic body in width-length directions.

4. The multilayer ceramic electronic component of claim 1, wherein the residual carbon removing path parts are respectively exposed to the second and fourth surfaces, and
   the residual carbon removing path parts exposed to the second and fourth surfaces are disposed to be offset from each other in a cross-section of the ceramic body in width-length directions.

5. The multilayer ceramic electronic component of claim 1, wherein the margin part includes nonconductive powder formed of any one selected from a group consisting of aluminum oxide and silicon oxide.

6. The multilayer ceramic electronic component of claim 1, wherein the margin part has a width of 200 μm or less in the width direction of the ceramic body.

7. A multilayer ceramic electronic component, comprising:
   a ceramic body including a dielectric layer and having first and third surfaces opposing each other in a length direction of the dielectric layer and second and fourth surfaces opposing each other in a width direction thereof;
   a multilayer part including a first internal electrode and a second internal electrode disposed to oppose each other, while having the dielectric layer interposed therebetween in the ceramic body, and exposed to the first and third surfaces opposing each other in a length direction of the ceramic body, respectively; and first and second external electrodes disposed on the first and third surfaces opposing each other in a length direction of the ceramic body, wherein one or more residual carbon removing path parts are formed to be protruded from both sides of the first and second internal electrodes in a width direction of the ceramic body, and exposed to the second and fourth surfaces opposing each other in a width direction thereof, respectively, wherein the multilayer ceramic electronic component further comprises a margin part including epoxy to cover the second and fourth surfaces opposing each other in a width direction of the ceramic body to which the residual carbon removing path parts are exposed, and wherein the residual carbon removing path parts are formed on one of both sides of the first and second internal electrodes, and alternately exposed to the second and fourth surfaces according to an order in which the first and second internal electrodes are stacked.

* * * * *